(12) United States Patent
Barakat et al.

(10) Patent No.: US 7,931,842 B2
(45) Date of Patent: Apr. 26, 2011

(54) SYSTEM AND METHOD FOR MAKING SHEETS, FILMS, AND OBJECTS DIRECTLY FROM POLYMERIZATION PROCESSES

(75) Inventors: Nicholas Barakat, Germantown, TN (US); William M. Karszes, Rosewell, GA (US)

(73) Assignee: Chemlink Capital Ltd., Stamford, CT (US)

(*) Notice: Subject to any disclaimer, the term of this patent is extended or adjusted under 35 U.S.C. 154(b) by 0 days.

(21) Appl. No.: 12/382,514

(22) Filed: Mar. 18, 2009

(65) Prior Publication Data

US 2009/0212457 A1     Aug. 27, 2009

Related U.S. Application Data

(60) Continuation-in-part of application No. 12/232,774, filed on Sep. 24, 2008, which is a division of application No. 11/509,028, filed on Aug. 24, 2006, which is a continuation of application No. 11/270,314, filed on Nov. 8, 2005, now abandoned.

(60) Provisional application No. 60/626,142, filed on Nov. 8, 2004.

(51) Int. Cl.
    *B29C 47/00*        (2006.01)
    *B28B 17/02*        (2006.01)
    *B01J 19/18*        (2006.01)

(52) U.S. Cl. ........... 264/176.1; 264/173.16; 264/172.11; 264/40.1; 264/40.3; 425/149; 422/224

(58) Field of Classification Search ............. 264/176.16, 264/176.1

See application file for complete search history.

(56) References Cited

U.S. PATENT DOCUMENTS

| | | | | | |
|---|---|---|---|---|---|
| 5,274,029 | A | * | 12/1993 | Kelley | 525/53 |
| 5,540,813 | A | * | 7/1996 | Sosa et al. | 159/47.1 |
| 5,651,928 | A | * | 7/1997 | Hodan et al. | 264/172.11 |
| 5,681,918 | A | * | 10/1997 | Adams et al. | 528/279 |
| 6,143,833 | A | * | 11/2000 | Klussmann et al. | 525/316 |
| 6,906,164 | B2 | * | 6/2005 | DeBruin | 528/308.1 |

\* cited by examiner

*Primary Examiner* — Philip C Tucker
*Assistant Examiner* — Vicki Wu
(74) *Attorney, Agent, or Firm* — Patton Boggs LLP

(57) ABSTRACT

A system for making sheets, films, and objects including a reactor-dryer for reacting at least one monomer to produce a polymer melt; a flash melter in communication with the reactor-dryer for heating the polymer melt received from the reactor-dryer; a flash tank in communication with the flash melter for removing volatile compounds from the polymer melt; and a control loop in communication with the flash tank for controlling the pressure of the polymer melt from the flash tank to a die forming unit. Methods of making sheets, films, and objects is further included.

10 Claims, 7 Drawing Sheets

SYSTEM AND METHOD FOR MAKING SHEETS, FILMS, AND OBJECTS DIRECTLY FROM POLYMERIZATION PROCESSES

CROSS-REFERENCE TO RELATED APPLICATIONS

This is a continuation in part application of prior U.S. patent application Ser. No. 12/232,774, filed Sep. 24, 2008, which is a divisional application of prior U.S. patent application Ser. No. 11/509,028, filed Aug. 24, 2006, which is a continuation application of prior U.S. patent application Ser. No. 11/270,314, filed Nov. 8, 2005, now abandoned, which claims the benefit of U.S. Provisional Application No. 60/626,142, filed Nov. 8, 2004. The entireties of these aforementioned applications are incorporated herein by reference.

FIELD OF THE INVENTION

The present invention relates to a system and method for making sheets, films, and objects, and in particular, to a system and method for making sheets, films, and objects directly from solution polymerization processes using free radical chemistry.

DESCRIPTION OF BACKGROUND INFORMATION

The means for preparing the sheets, films, and objects from various viscosities and forms of polymers has been known to require the use of pellets of the polymers. The resin of the melted polymer is passed through an extruder, and the barrel of the extruder may have vacuum venting in order to remove the humidity created during the extrusion process. A melt pump is used in order to produce an even melt throughput as it is pushed towards the extrusion die. Next, the molten resin is formed into a sheet or film by passing through an extrusion die. In the case of the rotary die, the objects are manufactured directly onto the rotary die and do not pass through the sheet phase. The sheet or film is then polished in a roll stack or passed through a calendar stack where the product is sized to the appropriate thickness. The sheet can then be surface treated with silicone on one or both sides. In the case of strapping material, the sheet is typically slit into strapping material. Finally, the sheet or film is then wound into a roll or slit and cut into finished sheets. Alternatively, film could be formed by the above process or by pumping through an annular die and expanding the molton polymer cylinder with air. This is referred to as the "bubble process." Typically, only film is produced with the bubble process. Generally, sheet is referred to as material having a thickness greater than 5-7 mils and film as material having a thickness of less than 5-7 mils. Oftentimes, material having a thickness of 5-7 mils may be referred to as either.

These various processes affect the performance of the polymer pellets when they are converted into a sheet form or injected onto a rotary die. In general, the physical properties of the polymers, such as its hygroscopicity in pellet form, negatively impact the polymers optical properties of the finished product if not adequately conditioned. When extruded, side reactions lead to the degradation of the polyester chain negatively impacting the properties. Furthermore, it has been a common practice to compensate for some of polymer pellets negative performances as pertaining to the hydroscopicity and degradation the viscosity levels during the extrusion process.

Two primary polymer processes for the manufacture of polymer include solution or slurry polymerization processes. Slurry and solution polymerization processes are usually free radical processes that are used to manufacture a great many polymers. The distinct advantage of these polymerization processes is the reaction temperature is controlled and maintained at a lower temperature and most of these reactions are also run as lower pressures. One disadvantage is that the solvent of diluent has to be removed prior to the processing. The two polymerization processes are different from one another in that the solution polymerization has the polymer dissolved in the solvent while the slurry process has the polymer suspended in the diluents.

SUMMARY OF THE INVENTION

The above-described problems are solved and a technical advance achieved by the present system and method for making sheets, films, and objects directly from polymerization processes ("system for making sheets, films, and objects") at a lower cost and which display excellent mechanical and optical properties by way of eliminating certain manufacturing process steps and directly passing the polymer melt from the reactor through a die and onto a surface instead of melting polymer resin in pellets through an extruder and then onto a surface. In the present system for making sheets, films, and objects, solution and slurry polymerization processes are directly connected to a formation of a sheet or film directly without using an intermediate extrusion process, which drastically reduces the cost of production of these objects and sheets.

By avoiding a series of manufacturing steps whereby the polymer melt is conditioned and altered during the preparation and extrusion process the optical and mechanical properties of the original polymer melt coming out of the reactor does not deteriorate or capture humidity. These are very important steps as these intermediary steps above are eliminated as the polymer resin is already in a melt phase and therefore does not have to be melted down through an extruder and also because no transportation was required which because of the hygroscopic nature of the pellet required a treatment of nitrogen. In addition, a multi-layer polymer may be manufactured using other substrates in one or more of the layers. The present system for making sheets, films, and objects allows for the preparation of particularly high quality polymer objects and sheets under mild reaction conditions since the polymer is never converted into pellets and re-melted through an extruder.

The resultant polymers from these processes are coupled through the use of a multiple pump system for making sheets, films, and objects to a forming process, such as sheet and film forming processes to produce finished goods.

The present system for making sheets, films, and objects can be effectively thermoformed into containers as well as slit into strapping material and when prepared into thick sheets can be used for display material for inside and outdoor signage. As the present system for making sheets, films, and objects pertains to the manufacture of items directly from the extruder die onto a sheet forming system or a rotary die, the results are the same, a superior product at a lower caliper without passing through the pellet stage, thus maintaining its I.V. level and inherent stiffness that translates into a higher mechanical performance. The present system for making sheets, films, and objects is a process by which a continuous polymer reactor system is coupled to a series of forming subsystems while maintaining constant pressure in each subsystem independent of the operating conditions of the other subsystems. Thus, speed changes, start-ups, shut-downs, and break downs are all overcome by the present system for making sheets, films, and objects.

In one aspect, the present system for making sheets, films, and objects extrudes products such as sheets or objects with a die, such as a rotary die, flat die (film forming process), and/or ringed die (bubble process), for example, directly from melt prepared from the polymerization reactor. The uniqueness of this present system for making sheets, films, and objects is in the handling of the melt stream from the reactor to the die. In order to extrude the melt through a die and maintain part thickness control, rigid control of the pressure entering each die needs to be maintained at a uniform set pressure and within tight tolerance. The present system for making sheets, films, and objects applies to controlling pressure into the die(s) feeding the forming device(s). A side chip stream may be added to the multiple forming lines as well as a plurality of pumps prior to the die(s). These novel additions allow for uniform part formation.

The present system for making sheets, films, and objects produces high quality polymer products in continuous and discontinuous forms wherein the polymer melt is obtained directly from the polymerization stage in a reactor using monomers, solvents, and/or catalysts and passed through the die directly onto a receiving surface without being converted into pellets. Polymer sheets produced by the above systems and methods herein described are manufactured at a lower cost, have a high structural homogeneity, enhanced optical properties and excellent mechanical strength. In the case of the manufacture of items directly from the reactor onto a rotary die, the results are the same, except the products manufactured are not previously converted into sheets, but formed into their final configuration.

In addition, the extruder, when coupled to a melt reactor system for making sheets and objects and appropriately controlled, provides a material requiring no preconditioning and whose thermal history is minimized. This coupling simplifies the process and leads to a better finished product. The negation of intermediate process steps, such as pelletizing and drying, reduce the overall manufacturing cost. Furthermore, the present system for making sheets, films, and objects simplifies the manufacturing process to manufacture polymer sheets and items on a rotary die where the polymer does not have to be treated prior to be processed through the extrusion die.

In one embodiment, the present method for making sheets, films, and objects directly from a polymerization reaction includes reacting at least one monomer to produce a polymer melt; flowing the polymer melt to a valve having at least two outlets; flowing the polymer melt from at least one of the at least two outlets to at least one distribution manifold, each of the at least one distribution manifold having at least two distribution lines; controlling individually the mass flow of the polymer melt in each of the at least two distribution lines independently of the other of the at least two distribution lines; and forming the sheets, films, and objects from the polymer melt.

In one aspect, the method further includes flowing the polymer melt from one of the at least two outlets to a side chip stream for forming pellets. Additionally, the reacting at least one monomer may further include reacting a catalyst with the at least one monomer. The catalyst may be selected from the group consisting of Ziegler-type catalysts, Ziegler-Natta catalysts, Philips-type catalysts, Kaminsky-type catalysts, methylamuinoxane, $Al(C_2H_5)_3$, and metallocene catalysts. In one aspect, catalysts determine whether or not addition or condensation is the route leading to the final polymer. The chosen catalyst may be dependent upon on monomer chemistry and resultant polymer. Preferably, at least one monomer is an olefin and more preferably, the at least one monomer is selected from the group consisting of ethylene, propylene, butylene, butadiene, pentene, hexene, octene, and styrene. In another aspect, the forming the sheets, films, and objects may further include forming the sheets, films, and objects directly from the polymer melt without producing an intermediate pellet used in extruding processes. In still yet another aspect, the material of the sheets, films, and objects is selected from the group consisting of linear low density polyethylene ("LLDPE"), low density polyethylene ("LDPE"), polypropylene, polystyrene, poly-methyl-methacrylate ("PMMA"), vinyl acetates, acrylonitrile, and esters of acrylic acid.

In one aspect, controlling individually the mass flow of the polymer melt includes controlling the pressure of the polymer melt with pressure control loops prior to the forming the sheets, films, and objects. Preferably, the method further includes heating the polymer melt in a flash melter. Also preferably, the method may further include removing volatile compounds from the polymer melt in a flash tank.

In another embodiment, the present invention includes a method for making multi-layer sheets or objects including reacting at least one monomer a polymer melt; removing volatile compounds from the polymer melt; controlling the flow of the polymer melt to a valve having at least two outlets to produce a first polymer melt stream and a second polymer melt stream; controlling the flow of the first polymer melt stream to a die forming unit; mixing an additive to the second polymer melt stream; controlling the flow of the second polymer melt stream to the die forming unit; and forming the multi-layer sheets, films, and objects from the first and second polymer melt streams.

In one aspect, the reacting of at least one monomer further includes reacting a catalyst with the at least one monomer. In another aspect, the catalyst is selected from the group consisting of Ziegler-type catalysts, Ziegler-Natta catalysts, Philips-type catalysts, Kaminsky-type catalysts, methylamuinoxane, $Al(C_2H_5)_3$, and metallocene catalysts. In still yet another aspect, the at least one monomer is an olefin. Preferably, the at least one monomer is selected from the group consisting of ethylene, propylene, butylene, butadiene, pentene, hexene, and styrene. Also preferably, the forming of the multi-layer sheets, films, and objects further includes forming the multi-layer sheets, films, and objects directly from the polymer melt without producing an intermediate pellet used in the extruding processes.

In another aspect, the material of the multi-layer sheets, films, and objects is selected from the group consisting of linear low density polyethylene ("LLDPE"), low density polyethylene ("LDPE"), polypropylene, polystyrene, poly-methyl-methacrylate ("PMMA"), vinyl acetates, acrylonitrile, and esters of acrylic acid. Preferably, the controlling of the mass flow of the first and second polymer melt streams includes controlling the pressure of the first and second polymer melt streams with pressure control loops prior to the forming of the multi-layer sheets, films, and objects. Also preferably, the method may further include heating the polymer melt in a flash melter. Additionally, the method may further include removing volatile compounds from the polymer melt in a flash tank.

In another embodiment, the present system for making sheets, films, and objects includes a reactor-dryer for reacting at least one monomer to produce a polymer melt; a flash melter in communication with the reactor-dryer for heating the polymer melt received from the reactor-dryer; a flash tank in communication with the flash melter for removing volatile compounds from the polymer melt; and a control loop in communication with the flash tank for controlling the pressure of the polymer melt from the flash tank to a die forming unit. In one aspect, the system for making sheets, films, and objects further includes a pre-mix vessel in communication with the reactor-dryer for receiving at least one of the group consisting of monomers, co-monomers, catalysts, and solvents and delivering them to the reactor-dryer.

In one aspect, the system may further include at least one polymer gear pump located between the flash melter and the flash tank for controlling the mass flow of the polymer melt to the flash tank. In another aspect, the system may further include at least one polymer gear pump located between the flash tank and the control loop for controlling the mass flow of the polymer melt to the control loop. Preferably, the system for making sheets, films, and objects may further include at least one additive unit located between the flash melter and the flash tank for adding an additive to the polymer melt prior to polymer melt entering the flash tank.

In another embodiment, the present system for making multi-layer sheets, films, and objects, includes means for reacting at least one monomer to produce a polymer melt; means for removing volatile compounds from the polymer melt; means for controlling the flow of the polymer melt to a valve having at least two outlets to produce a first polymer melt stream and a second polymer melt stream; means for controlling the flow of the first polymer melt stream to a die forming unit; means for mixing an additive to the second polymer melt stream; means for controlling the flow of the second polymer melt stream to the die forming unit; and means for forming the multi-layer sheets, films, and objects from the first and second polymer melt streams.

In one aspect, the means for reacting at least one monomer may further include means for reacting a catalyst with the at least one monomer. Also, the catalyst may be selected from the group consisting of Ziegler-type catalysts, Ziegler-Natta catalysts, Philips-type catalysts, Kaminsky-type catalysts, methylamuinoxane, $Al(C_2H_5)_3$, and metallocene catalysts. In another aspect, the at least one monomer is an olefin. Preferably, the at least one monomer is selected from the group consisting of ethylene, propylene, butylene, butadiene, pentene, hexene, and styrene. Also preferably, the means for forming the multi-layer sheets, films, and objects may further include means for forming the multi-layer sheets, films, and objects directly from the polymer melt without producing an intermediate pellet used in extruding processes. In one aspect, the material of the multi-layer sheets, films, and objects is selected from the group consisting of linear low density polyethylene ("LLDPE"), low density polyethylene ("LDPE"), polypropylene, polystyrene, poly-methyl-methacrylate ("PMMA"), vinyl acetates, acrylonitrile, and esters of acrylic acid. In another aspect, the means for controlling the mass flow of the first and second polymer melt streams includes means for controlling the pressure of the first and second polymer melt streams with pressure control loops prior to the forming the multi-layer sheets, films, and objects. Preferably, the system for making sheets, films, and objects includes a means for heating the polymer melt in a flash melter and a means for removing volatile compounds from the polymer melt in a flash tank.

DETAILED DESCRIPTION OF THE DRAWINGS

Figure 1:
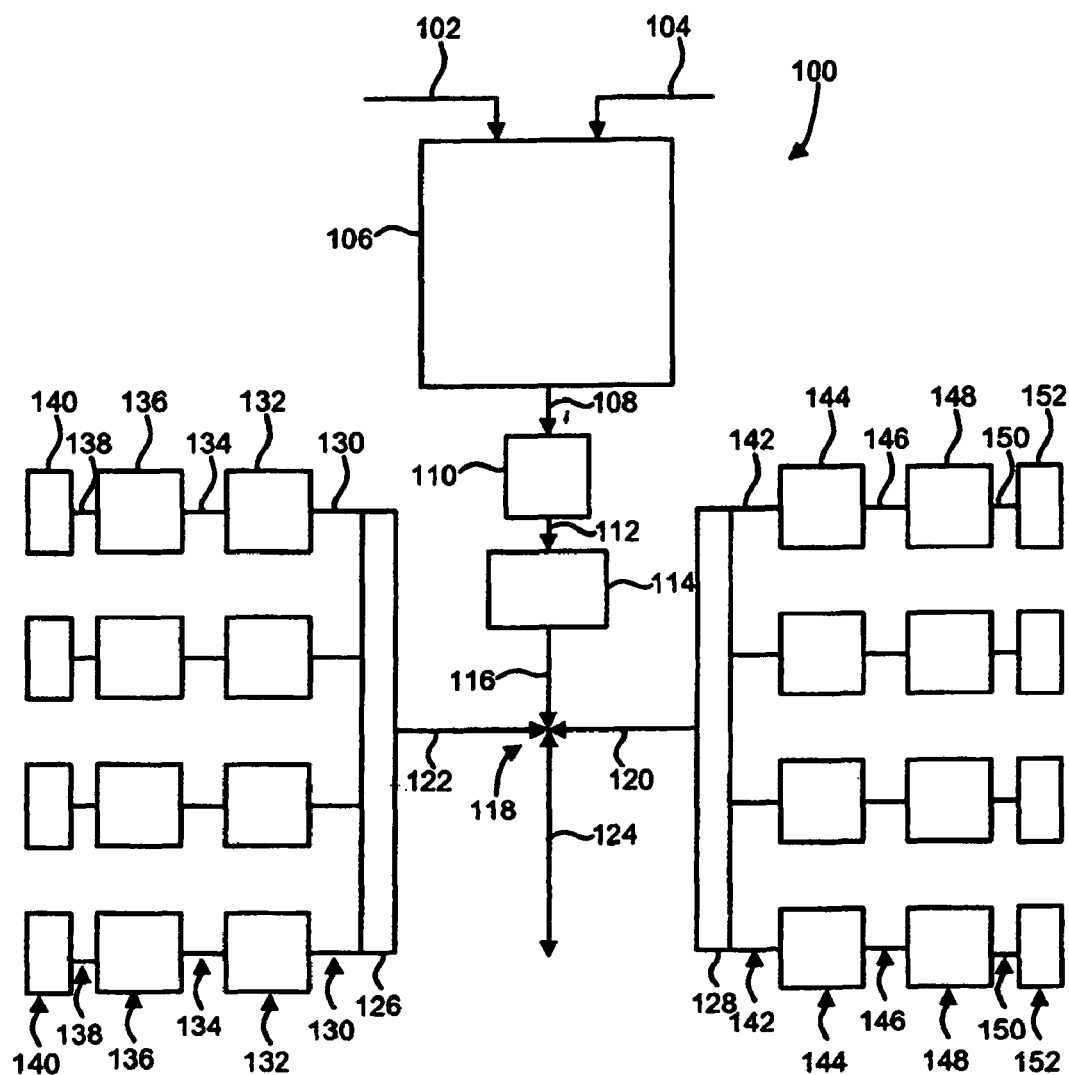
FIG. 1 illustrates a block diagram of the system for making PET sheets according to an embodiment of the present invention.

The term PET films generally means a rigid film of PET or APET of at least 5 mils. This sheet can be converted into rolls of different diameters or directly slit into sheets. PET and APET resin are used interchangeably as the resin used to manufacture the APET rigid film. Like reference numerals are used to indicate like parts throughout the drawings. FIG. 1 illustrates an embodiment 100 of a system for making PET sheets. Precursors or raw materials are fed into the reactor 106 of the system for making PET sheets 100. In one embodiment, the precursors include a feedstock of Pure Terephthalate Acid ("TA") or Dimethyl Terephthalate ("DMT") 102 and a feedstock of Mono Ethylene Glycol ("MEG") 104. In another embodiment, another glycol, such as DEG may be used. In another aspect of the present invention, secondary precursors, such as Cyclohexanedimethanol (CHDM) may be used in combination with the primary precursors, such as MEG. In this aspect, the final product is a glycolized polyester (PETG).

In one embodiment, the two feedstocks 102 and 104 produce an intermediate bis-(2-hydroxyethyl)terephthalate, which may be converted to polyethylene terephthalate by heating at a temperature above the boiling point of the ethylene glycol or the reaction mixture under conditions effecting the removal of the glycol or water. The feedstocks 102 and 104 are reacted in the reactor 106 by esterification and polymerization to produce the PET melt. The heating in the reactor 106 may occur at a temperature as high as 325° C., if desired. During heating, pressure is reduced so as to provide rapid distillation of the excess glycol or water. The final polyethylene terephthalate polymer may have an I.V., as measured in orthochlorophenol at 25° C., in excess of 0.3 dl/gm. More preferably, the I.V. of the polymer ranges from about 0.4 to about 1.0 dl/gm, measured in orthochlorophenol at 25° C. Still more preferably, the polyethylene terephthalate employed in the present system for making PET sheets 100 has an I.V. of about 0.5 to about 0.7 dl/gm as measured in orthochlorophenol at 25° C. The thermoplastic polyester containing polymers of this present system for making PET sheets 100 have a preferred melting point in the range of from about 200° C. to about 330° C. or more preferably from about 220° C. to about 290° C. and most preferably from about 250° C. to about 275° C.

In one aspect, the present system for making PET sheets 100 produces PET sheets. In another aspect, the present system for making PET sheets 100 is used to produce all types of products, including sheets, with all other types of molten polymers. Another exemplary molten polymer is a linear low density polyethylene (LLDPE) polymer. In addition to homopolymers, the present system for making PET sheets 100 may be used with copolymers of PET, such as adding cyclohexane dimethanol (CHDM) in place of the ethylene glycol or isophthalic acid in place of some of the terphthlate units. These are examples of slurry copolymers off the base reaction that can be utilized in this manufacturing process.

Many different kinds of additives can also be added into the PET melt, depending on the nature of the desired properties in the finished article. Such additives may include, but are not limited to, colorants, anti-oxidants, acetaldehyde reducing agents, stabilizers, e.g. U.V. and heat stabilizers, impact modifiers, polymerization catalyst deactivators, melt-strength enhancers, chain extenders, antistatic agents, lubricants, nucleating agents, solvents, fillers, plasticizers and the like. Preferably, these additives are added into the reactor 106, but may be added at other locations of the present system for making PET sheets 100.

The PET melt is then fed via pipe 108 to a master pump 110 where it is pumped to a filter 114 via pipe 112. In this embodiment, the master pump 110 feeds the PET melt throughout the distribution subsystem. The PET melt is based through the filter 114 to clear the PET melt of any foreign particles either introduced through the feed stream or produced by the reaction. Preferably, the filter 114 is used to screen out any large gels, degraded particles or extraneous material deleterious to the downstream melt pumps or to the final product. Various grades of filter medium or mediums (mechanical screens, sand, sintered metal, etc.) can be used. The proper design (volume, pressure drop and residence time) of the filter 114 is important to maintain the proper pressure throughout the present system for making PET sheets 100.

The PET melt is then fed to a valve 118 via pipe 116. In this particular embodiment, the valve 118 is a four way valve including one inlet and three outlets. Preferably, valve 118 may have any number of outlets to fit a desired application. The valve 118 feeds PET melt into a bypass chip stream 124. This stream produces PET pellets that are conditioned to produce low acetaldehyde PET. This material can be sold directly for bottles or utilized in a coextrusion process (FIG. 2) to produce a multi-layered film. Additionally, the valve 118 also feeds PET melt into two distribution manifolds 126 and 128 feeding a multitude of forming streams. Although two distribution manifolds 126 and 128 are shown, one or more than distribution manifolds can be used. Preferably, manifolds 126 and 128 are designed to provide minimum residence time and flow of the PET melt through each down stream units such that the residence time and pressure drop are optimized. Preferably, the lay-out, design, and sizing of the downstream equipment is considered in determining the residence time and flow of the PET melt through the manifolds 126 and 128.

Distribution manifold 126 feeds the PET melt to one or more acetaldehyde reduction units 132 via pipes 130. Similarly, distribution manifold 128 feed PET melt to one or more acetaldehyde reduction units 144 via pipes 142. The acetaldehyde content of the PET is directly related to the time in each channel. Acetaldehyde reduction units 132 and 144 reduce the acetaldehyde content in the forming channels, pipes, or system to preferably less than 10 parts per million ("PPM"). If the pipes 108, 112, 116, 120, 122, 130, and 142 has a sufficiently low residence time to produce less than 10 PPM, then no acetaldehyde reduction units 132 and 144 may be required.

The acetaldehyde reduction units 132 and 144 may include thin film evaporators, vacuum degassing, acetaldehyde scavenger additions, or any other process to reduce acetaldehyde in a continuous melt stream. The acetaldehyde reduction units 132 and 144 can be, but not limited to, a thin film device, a vacuum screw section, or an acetaldehyde additive feeder with static mixer. In one aspect, the acetaldehyde reduction units 132 and 144 may be any apparatus known in the art for generating a large amount of surface area per unit volume and/or for rapidly regenerating the exposed melt surface. The acetaldehyde reduction units 132 and 144 should subject the liquid surface to a low partial pressure of acetaldehyde either by inert gas purging as described in U.S. Pat. No. 5,597,891, applied vacuum or both. The acetaldehyde reduction units 132 and 144 may be a vented single-screw extruder (U.S. Pat. No. 4,107,787), a vented twin-screw extruder (U.S. Pat. No. 3,619,145), a rotating disk processor (U.S. Pat. No. 4,362,852), or device which generates thin strands of polymer (U.S. Pat. No. 3,044,993), all of which are incorporated herein by reference.

The acetaldehyde reduction units 132 and 144 may also include suitable mixers, such as static mixers, gear pumps, and/or single or multi-screw extruders, all of which are well known in the art. In one aspect, an acetaldehyde stripping agent is injected into the acetaldehyde reduction units 132 and 144 by an injection nozzle (not shown) at a rate of about 1.0 SCF/lb of the polymer or less. The activity of the mixer forms a multitude of small gas bubbles in the PET melt. The acetaldehyde and other by-products present in the PET melt diffuse into the gas. Suitable stripping agents that are inert to the PET melt include nitrogen, carbon dioxide, C1 to C4 hydrocarbons, dehumidified air, and the noble gases. The more preferred stripping agents are carbon dioxide and nitrogen. Throughout the process, the PET melt is maintained at a temperature greater than the melting point of the PET melt, but preferably no greater than from about 10° C. to about 15° C. higher than its melting point.

In one embodiment, the acetaldehyde reduction units 132 and 144 include a vacuum section with a screw element in the line through the vacuum section. The vacuum will reduce the acetaldehyde content and the screw element will internally increase the melt pressure after the vacuum section is passed. Preferably, the pressure is reduced during vacuuming to prevent the PET melt from going through the vacuum port, then the pressure may be increased with the screw element.

The PET melt is then fed from the acetaldehyde reduction units 132 and 144 to a plurality pumps 136 and 144 via pipes 134 and 142, respectively. The pumps 136 and 144 are used to produce a constant pressure into the die forming units 140 and 152 via pipes 138 and 150, respectively. The plurality of pumps 136 and 144 are required to maintain a fixed pressure with minimal variation by balancing the pressure disturbances in the entire system.

In one embodiment, the pumps 136 and 144 are gear pumps which pass a known volume through with each revolution. The speed of the pumps 136 and 144 may be controlled by a pressure sensor on the outlet side. As the pressure is reduced the pumps 136 and 144 speed up and visa versa on high pressure.

In one embodiment, the present system for making PET sheets system for making PET sheets 100 is a continuous process which is not shut down once it is started. One way to control the mass flow of the PET melt through the present system for making PET sheets 100 is by adjusting the mass flow of the feedstocks 102 and 104 into the reactor 106. A pressure feed back loop can be used to control the valve 118. The valve 118 to the bypass chip stream 124 can be opened more or less to modulate the PET melt going into each distribution manifold 126 and 128. The pumps 136 and 148 are used to control the final pressure into the die forming units 140 and 152. Nevertheless, due to the critical nature of the pressure entering the die forming units 140 and 152, it may be necessary or preferably to add more than one pump at this point. The additional pumps (not shown) may be used in tandem and are controlled by a pressure feed back loop to change the mass flow of PET melt into the die forming units 140 and 152 as the forming line changes speed or are shut down. Although a single pump can be used, the variation in pressure do to the influence of pressure changes from any other section in the entire distribution system may not sufficient to maintain part dimensional uniformity. As an example, it is preferable to maintain +/−1 bar in pressure into a flat die to maintain proper control of the finished sheet.

In one embodiment, the present system for making PET sheets 100 produces PET sheets in a continuous mode from PTA and MEG directly from the melt phase of the reactor 106 to an extruder die without passing through a nitrogen treatment, an extruder and other steps and rolled or not in the longitudinal direction. In another embodiment, the present system for making PET sheets 100 flows the PET melt directly from the reactor 106 and an extruder die onto rotary dies for the manufacturing of packaging material and other items.

In one embodiment, the die forming units 140 and 152 are a three roll stacks or sir (air) knife system. More preferably, the die forming units 14 and 152 are a horizontal three roll stack system. Typically, down stream of the roll stack are auxiliary systems such as coaters, treators, slitting devices, etc. that feed into a winder. These units are properly specified to the individual leg of the manifold and to the overall capacity of the reactor 106.

In another embodiment, another type of unit would be a low draw rotary die that forms parts such as bottle caps or lids directly on the rotary die from the formed sheet.

In one embodiment, there is one pump 110 feeding the manifold systems 126 and 128. Preferably, at the end of each manifold leg, prior to the die and sheet or rotary die, there are one or two individual pumps 136 and 148, respectively. Preferably, pump 110 maintains the pressure into the manifolds 126 and 128. This pump 110 is controlled by the pumps 136 and 148. If the pressure drops the pump 110 will increase pressure. If the pressure rises then either the pump 110 slows down or the PET melt material is switched into the bypass chip stream 124 bypassing the manifolds 126 and 128. Preferably, if the manifolds 126 and 128 are going to be have a lower throughput for an extended period of time, such as for several hours, then a signal will be given to the reactor 106 to slow the feed to compensate for the lower throughput. Where pumps 136 and 148 include two pumps in series, the first pump of the multiple pump arrays is used to modulate the pressure in the manifolds 126 and 128, respectively. In this arrangement, the first pump in the series of pumps comprising pumps 136 and 148 maintains a constant pressure head into the second pump in the series of pumps. Preferably, the multiple pumps provides highly dependent thickness control with a constant pressure into the die forming units 140 and 152. The first pump will modulate any large swings in pressure. The second pump and each proceeding pump will further reduce any modulation down to less then +/−1 bar after the final pump. This provides for the forming lines (outputs) to remain independent so they can slow down, start stop or increase speed independently of the other die forming units 140 and 152. The pressure control loops with the bypass chip stream 124 will provide this function. In one embodiment, the pumps are volumetric pumps as described herein.

In one aspect, APET melt, which may be used to prepare the PET sheet, is produced by melting PET pellets into an extruder and then dropping it onto a surface where the melt is formed into a sheet. In the case of the preparation of items using a rotary die, the melt is passed through a extruder die and deposited directly onto a rotary die, where the items are manufactured.

In another embodiment, the mass flow of PET melt may be controlled by controlling the pressure of the PET melt with pressure control loops in communication with the pumps 136 and 148 prior to the die forming units 140 and 152 to control pressure and maintain pressure independently of the individual pipes 138 and 150 throughput requirements or what the other individual pipes 138 and 150 or flow channels are producing.

The pressure control logic controls the continuous slurry reactor 106 whose response time is typically greater in magnitude than that at the output ends at the die forming units 140 and 152 to control the thickness of the final product or sheet. In one embodiment, this is accomplished while having each output leg remain independent of the other output legs. In one embodiment, the control loop provides for sudden process upsets, such as starting or stopping of one of the output legs. In this embodiment, a bypass chip stream 124 allows for the chip production to increase or decrease based on any process upset. The upset can be a planned upset, such as stopping a line for maintenance, etc., or unplanned upset, such as an equipment malfunction.

In addition to the above, the control loop preferably compensates for one leg increasing or decreasing speed while continuing the overall system for making PET sheets 100 in a steady state. The pump 100 and associated valves (not shown) will react by diverting to or from the bypass chip stream 124. This may cause a brief spike or change in pressure that will be reacted to by the pumps 136 and 144 at the end of each manifold 126 and 128 that will then react to the pressure spike and modulate it in a controllable and desirable fashion. In this embodiment, the individual pumps that comprise the pumps 136 and 144 will experience the pressure spike and react to it while the second pump in the series will experience the modulation of the upset magnitude that will be sufficiently low as to be modulated out in the order of magnitude of less than a second. In another embodiment, each line configuration is going to be different so individual schemes will apply to that system. Preferably, a combination of the manifolds 126 and 128, pumps 136 and 144, and control loop provide an optimized PET melt pressure and flow through the pipes to the forming portions or die forming units 140 and 152.

Figure 2:
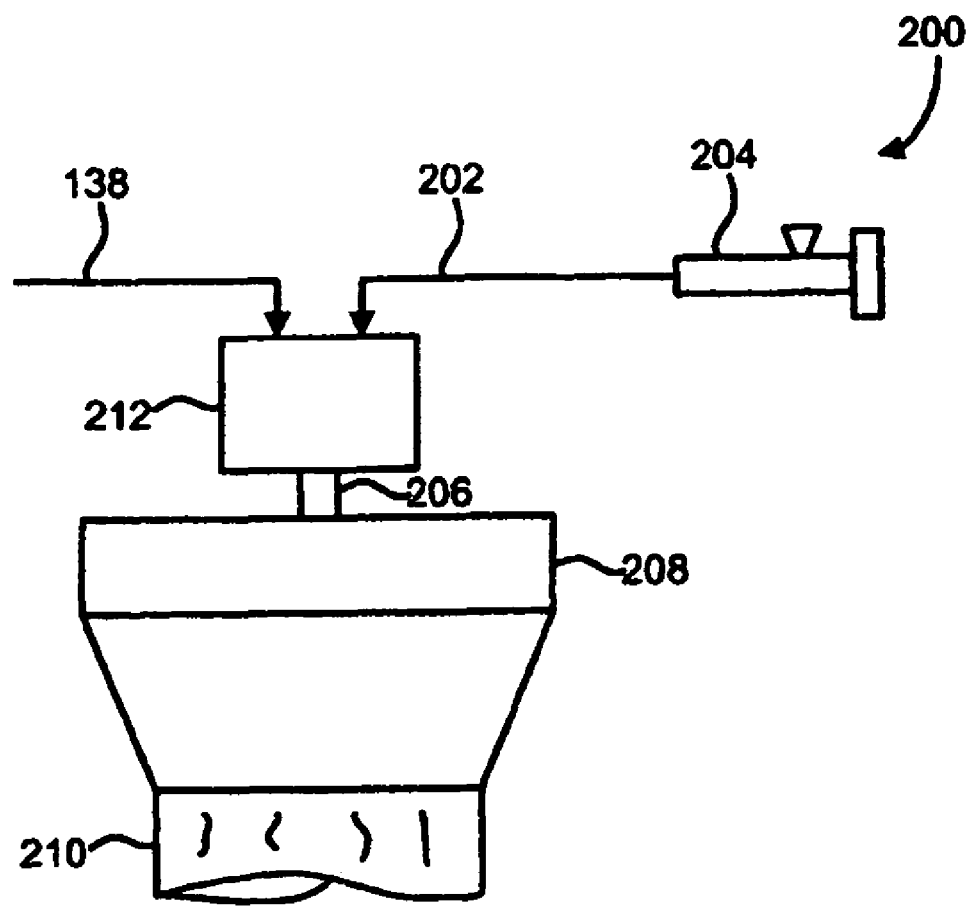
FIG. 2 illustrates block diagram of a die and co-extruder of the system for making PET sheets according to an embodiment of the present invention.

FIG. 2 shows an embodiment 200 of a co-extrusion subsystem to produce multi-layered sheet by adding a co-extruder 204 to the PET melt contained in pipe 138 or 150. The co-extruded material is fed from the co-extruder 204 to a feed block 212 via pipe 202 along with the PET melt from the flow channels as described above. The feed block 212 then layers the materials properly into the flat die 208. This feed block 212 orientates the streams producing a multi-layer stream, which is fed to a flat die 208 via pipe 206 where it is extruded into the sheet forming section or PET sheet 210. The co-extruder 204 can use resin pellets from the bypass chip stream 124 or be a different material such as an adhesive tie layer or barrier resin, but not limited to these examples. This co-extrusion process may be added to any or all the die forming units 140 and 150. In one embodiment, the size of the co-extruder 204 is designed relative to the pounds throughput required. In using a co-extruder 204 in the present system for making PET sheets 100, preferably, the added pounds of material added into the system must be taken into account to provide the required cooling capacity of the leg of the present system for making PET sheets 100.

Figure 3:
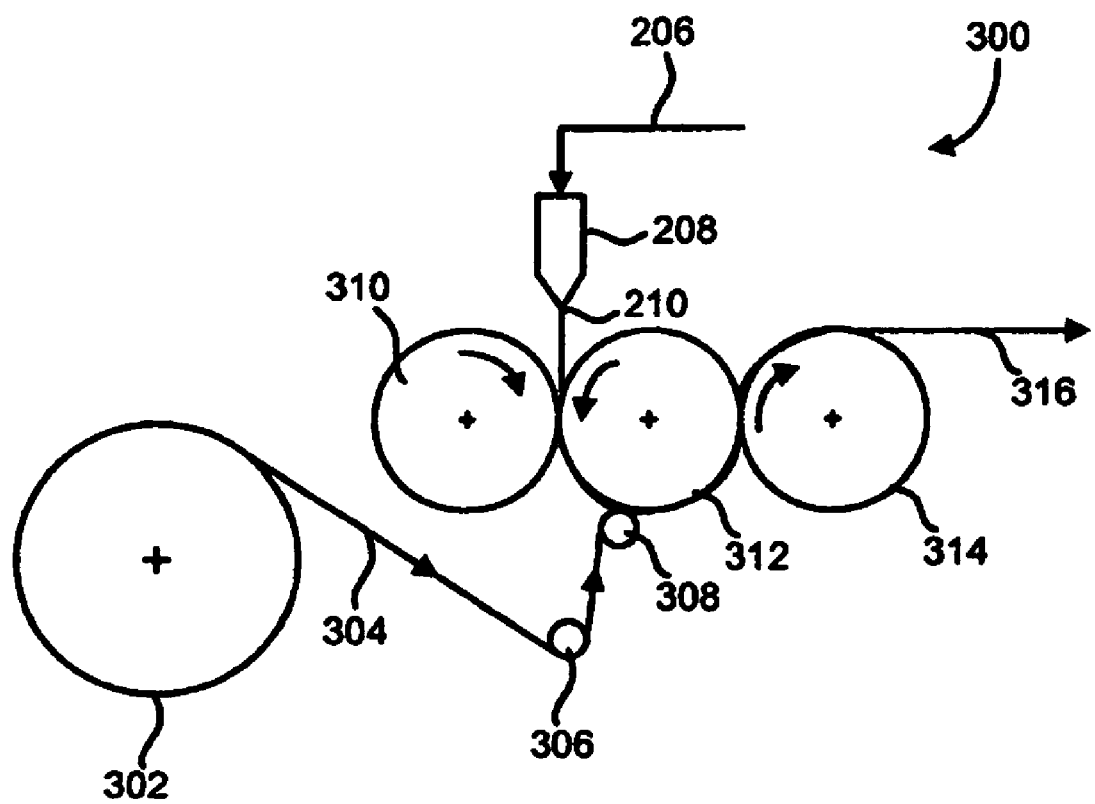
FIG. 3 illustrates a block diagram of a die and laminated sheet subsystem of the system for making PET sheets according to an embodiment of the present invention.

FIG. 3 shows an embodiment 300 of a subsystem to create a laminated multi-layered structure or PET sheet. The PET melt (either single layered or multi-layered coextruded) is fed through the flat die 208 via pipe 206 into the forming rolls 310 and 312. In one embodiment, an additional film 304 is fed into the forming rolls 308 and 310. The heat from the PET melt stream bonds the additional film 304 into a coherent laminated structure 316. Additional rollers 306 and 308 may be employed for guiding the additional film from the feed spool 302 to the forming rolls 312. In another embodiment, other materials such as metal foils, or EVOH film can be added to the laminating process. In yet another embodiment, other types of materials may be added to the laminating process. Each of these unique structures then can be used for specific end applications.

Preferably, the design criteria for the subsystem to create a laminated multi-layered structure or PET sheet 300 is to provide the highest quality sheet from the lowest capital investment. The high throughput of PET melt through the system for making PET sheets 100 requires good design of cooling rolls so deflections do not occur. The ability to monitor and control thickness of the PET sheets during cooling is important. In addition, the ability to change sizes and thicknesses of PET sheets is important as well. Further downstream operations, such as winding and slitting are also considered when using the laminated multi-layered structure or PET sheet 300.

As has been shown, the resulting product or PET sheet is determined by the die forming units 140 and 152. This present system for making PET sheets 100 controls the die forming units 140 and 152 with such precision (as well as an extrusion system) that the objects produced by this system are limited only by the creativity of the manufacturer.

In one embodiment, the present system for making PET sheets 100 controls the pressure from a continuous reactor 106 to multiple flow channels. Each channel is tied to a forming section producing different objects. Each flow channel acts as an individual extruder without an extruder. In another embodiment, a single pump 136 may be used if the pump dynamics are accounted for in the process control algorithm.

In one embodiment, the present system for making PET sheets 100 impacts favorably the mechanical and optical properties of the PET sheet being manufactured that will enable the PET sheet to be manufactured at a lower caliper when being manufactured for packaging or other application such a sheets, strapping, architectural items.

The present system for making PET sheets 100 produces PET objects and articles that have quality of trim and other waste generated as part of the manufacturing process will be of high quality such that it can be blended in high percentages with virgin PET melt without negatively impacting the final sheet quality and the need to increase caliper.

Figure 4:
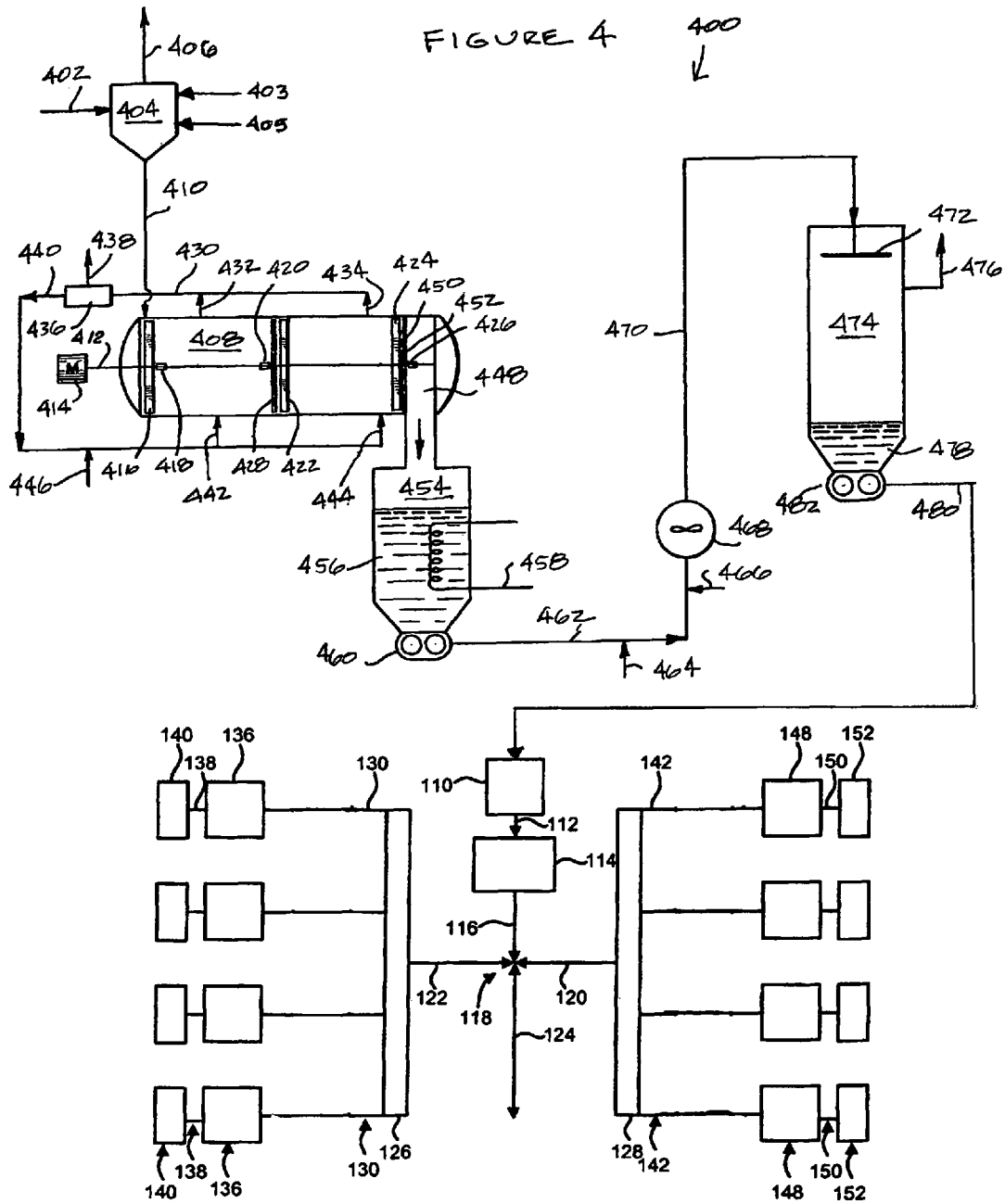
FIG. 4 illustrates a block diagram of a system for making sheets, films, and objects according to an embodiment of the present invention.
Figure 5:
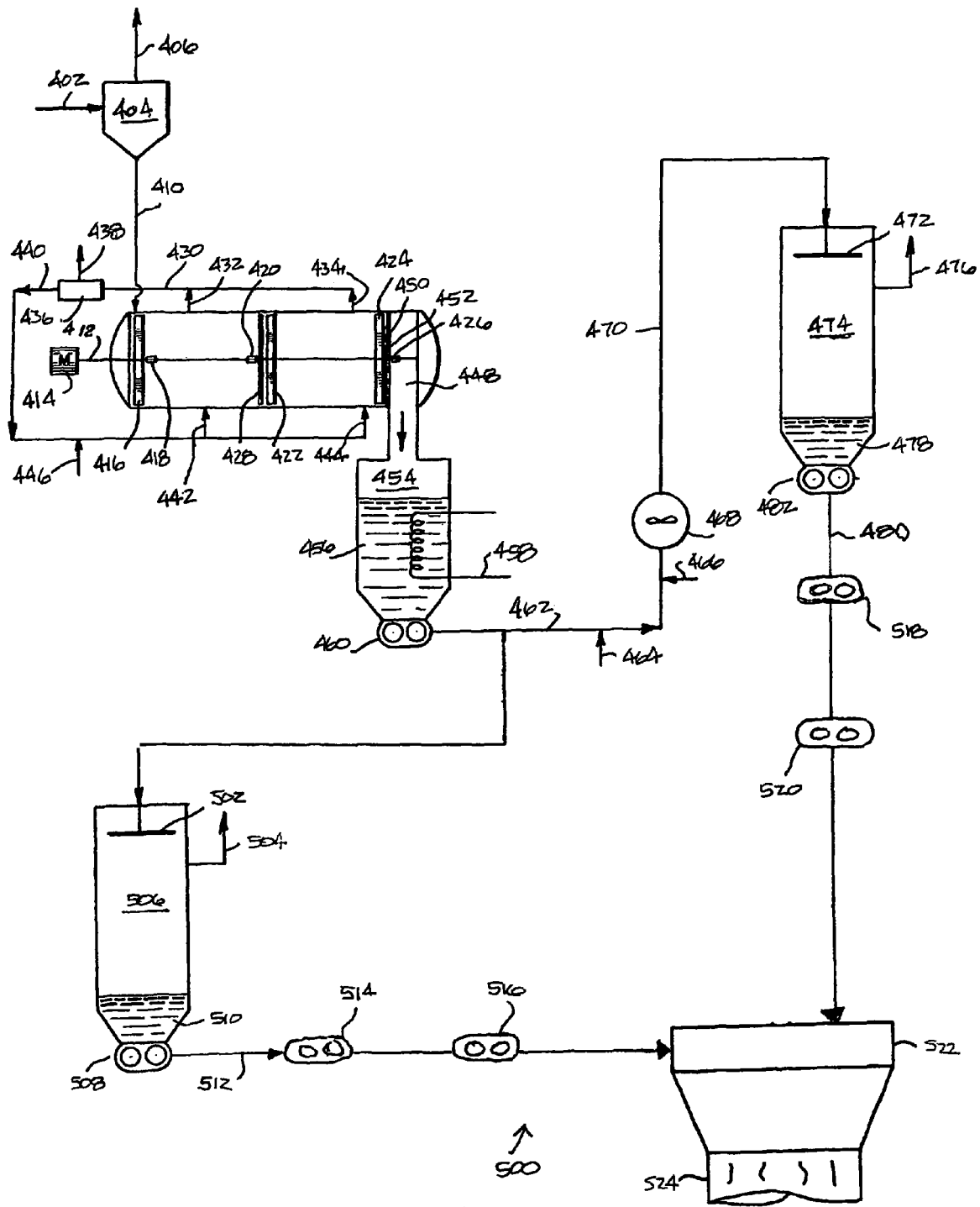
FIG. 5 illustrates a block diagram of a system for making sheets, films, and objects according to another embodiment of the present invention.

Referring now to FIGS. 4-5, embodiments of a system for making sheets, films, and objects 400 and 500, respectively, are shown. System for making sheets, films, and objects 400 may include the introduction of components, compounds, or feedstocks for producing a polymer melt in a reactor-dryer 408, as described further below, through line 402 to separator or pre-mix vessel 404. Pre-mix vessel 404 may be a device for partially removing easily vaporizable, liquid components from the slurry and can be for example a hydroclone, a centrifuge or another device of a similar nature. Some of the slurry medium is removed in pre-mix vessel 404 and passes generally as a liquid through line 406 and thereafter is recycled to the reactor without additional treatment, for example. The concentration step is preferred, but optional, and slurry from the reactor can be led directly into reactor-dryer 408. In such a case, reactor-dryer 408 may be of larger size for a given polymer throughput and may require a larger rate of gas recycle, and do a larger fraction of the overall amount of polymerization. The concentrated slurry is passed from pre-mix vessel 404 through line 410 into reactor-dryer 408. Additionally, a catalyst may be fed into pre-mix vessel 404 through line 403 for being mixed with the polymer slurry prior to feeding into reactor-dryer 408. Also, a solvent may be fed into pre-mix vessel 404 through line 405 for being mixed with the polymer slurry prior to feeding into reactor-dryer 408.

Reactor-dryer 408 may be horizontal, preferably carbon steel, cylindrical device having centrally-located drive shaft 412 passing longitudinally through the major portion of its length and driven by a motor 414. A plurality of adjacently attached two paddle impellors represented in part by 416, 418, 420, 422, 424, and 426 are secured to drive shaft 412. Their number is sufficient for adequate heat transfer without bed fluidization of the particulate contained in reactor-dryer 408. Each paddle may extend radially outward from drive shaft 412 and may have a small clearance with the inner surface of reactor-dryer 408. Barrier (baffle) 428, which is attached to drive shaft 412, divides reactor-dryer 408 into two polymerization-drying sections and may be a thin metal disk filling about three-fourths of the cross-sectional area of reactor-dryer 408, for example. Line 430 removes off-gases through outlets 432 and 434 from reactor-dryer 408 and may lead them to separation zone 436 wherein condensable components are removed through line 438, which components can be recycled directly to the reactor-dryer 408. The gaseous components of said off-gases are removed from separation zone 436 through line 440 and returned to reactor-dryer 408 via recycle inlets 442 and 444. Make-up monomer or monomers and optionally hydrogen are added through line 446.

As particulate contained in reactor-dryer 408 moves towards take-off zone 448 essentially by overflow, it is gradually dried by evaporation using heat of polymerization from polymerization taking place in reactor-dryer 408. Substantially dried polymer particulate is taken off via impellor 424, aperture 450 in barrier (baffle) 452 and impellor 426 at a rate dependent upon the rate of slurry introduction. Dried particulate then falls through take-off zone 448 into flash melter 454 in which a polymer particulate phase sits on top of molten polymer phase 456. A further amount of polymerization takes place in flash melter 454 which, together with a variable (depending upon the monomer being polymerized etc.) amount of heat supplied by heater 458, melts the particulate forming an easily transferable polymer melt that is pumped from flash melter 454 by polymer gear pump 460. In another embodiment, reactor-dryer 408 may be a vertical bulk polymerization reactor, such as that described in U.S. Pat. No. 4,325,915 issued Apr. 20, 1982 to Sato et al., the subject matter is herein incorporated by reference. In another embodiment, the reactor-dryer 408 may be a continuous polymerization reactor as that described in U.S. Pat. No. 4,587,314 issued May 6, 1985 to Wilt, the subject matter is herein incorporated by reference. In another embodiment, the reactor-dryer 408 may be a continuous slurry polymerization process and apparatus as described in U.S. Pub. Pat. App. No. 2007/0274873, the subject matter is herein incorporated by reference. The polymer melt removal process of the system for making sheets, films, and objects 400 and 500 may be those described in U.S. Pub. Pat. App. No. 2007/0274873 and the removal conditions may be the same as those described in U.S. Pub. Pat. App. No. 2007/0274873.

Continuing with reference to FIG. 4, the melt is pumped through line 462 where it can be treated with a catalyst kill agent entering through line 464 and additives (stabilizers, colorants, etc.) can be added through line 466. In one aspect, the polymer melt may be removed from reactor-dryer 408 and fed through line 464 by a process described in U.S. Pat. No. 3,203,766 issued Aug. 31, 1965 to Mudd et al., which is hereby incorporated by reference. The polymer melt removal process of the system for making sheets, films, and objects 400 and 500 may be those described in U.S. Pat. No. 3,203,766 and the removal conditions may be the same as those described in U.S. Pat. No. 3,203,766. In another aspect, the polymer melt may be removed from reactor-dryer 408 and fed through line 464 by a process described in U.S. Pat. No. 4,686,279 issued Aug. 11, 1987 to Nagtzaam et al., which is hereby incorporated by reference. The polymer melt removal process of the system for making sheets, films, and objects 400 and 500 may be those described in U.S. Pat. No. 4,686,279 and the removal conditions may be the same as those described in U.S. Pat. No. 4,686,279.

In one embodiment, hydrocarbons may be removed from a slurry polymer melt prior to feeding the polymer melt to a die or die forming unit as described herein. In one example, a hydrocarbon-containing polymer slurry as described herein is fed to flash tank 474 to flash a portion of the hydrocarbon from the slurry. A fraction of the residual slurry is circulated through a heating means and recirculated back to the flash tank 474 to flash additional hydrocarbon from the slurry. In one aspect, the system for making sheets, films, and objects 400 and 500 may be applicable for removing isobutane solvent from an aqueous polyethylene slurry. It may also be applicable to the removal of other hydrocarbons, including solvents, monomers, and co-monomers from polymer slurries, for example. In another aspect, the hydrocarbon may be removed from the slurry polymer melt by a process described in U.S. Pat. No. 5,207,929 issued May 4, 1993 to Sung, et al., which is hereby incorporated by reference. The hydrocarbon removal process of the system for making sheets, films, and objects 400 and 500 may be those described in U.S. Pat. No. 5,207,929 and the removal conditions may be the same as those described in U.S. Pat. No. 5,207,929.

In another embodiment, another hydrocarbon removal process is described in U.S. Pat. No. 5,292,863 issued May 8, 1994 to Wang, which is hereby incorporated by reference. The hydrocarbon removal process of the system for making sheets, films, and objects 400 and 500 may be those described in U.S. Pat. No. 5,292,863 and the removal conditions may be the same as those described in U.S. Pat. No. 5,292,863.

In yet another embodiment, polymer melt may be devolatilized by the process described in U.S. Pat. No. 6,211,331 issued Apr. 3, 2001 to Craig, which is hereby incorporated by reference. The devolatization process of the system for making sheets, films, and objects 400 and 500 may be those described in U.S. Pat. No. 6,211,331 and the devolatization conditions may be the same as those described in U.S. Pat. No. 6,211,331. Another devolatization process of the system for making sheets, films, and objects 400 and 500 is described in U.S. Pat. No. 6,800,698 issued Oct. 5, 2004 to Kendrick et al, which is hereby incorporated by reference. The devolatization process of the system for making sheets, films, and objects 400 and 500 may be those described in U.S. Pat. No. 6,800,698 and the devolatization conditions may be the same as those described in U.S. Pat. No. 6,800,698.

In another embodiment, polymer melt may be devolatilized by the process described in U.S. Pat. No. 6,806,324 issued Oct. 19, 2004 to Hottovy et al., which is hereby incorporated by reference. The devolatization process of the system for making sheets, films, and objects 400 and 500 may be those described in U.S. Pat. No. 6,806,324 and the devolatization conditions may be the same as those described in U.S. Pat. No. 6,806,324.

Additives added through line 464 may also include additives for making multi-layer objects or sheets, such as shrink or stretch wrap films, for example. Alternatively, additives can be added partially or wholly into flash melter 454. The polymer melt is passed through mixer 468 to disperse kill agent etc. and through line 470 to stranding die 472 and placed in the top of devolatilizer or flash tank 474. Volatile components removed from the molten polymer in flash tank 474 are removed through line 476 either by vacuum or by employing a sweep of inert gas entering through another line (not shown) which can be suitably connected to flash tank 474. Polymer melt 478 collects at the bottom of flash tank 474 and is pumped through line 480 by polymer gear pump 482 to a control loop as shown and discussed in FIG. 1. As shown in FIG. 4, system for making sheets, films, and objects 400 may not include acetaldehyde reduction units 132 and 144 for some polymer melts. Preferably, the content of volatile compounds in the polymer melt 478 is removed or decreased to a desirable level in the flash tank 474. Additionally, any residual polymer melt 478 remaining in the flash tank 474 may be recycled back into the reactor-dryer 408.

Polymer slurry from the reactor-dryer 408 is allowed to enter the reactor-dryer 408 at a rate, which preferably gives no appreciable constant liquid phase in the bed of the reactor-dryer 408. As can be understood by one skilled in the art this rate depends upon the temperature, pressure, and sweep rate in the reactor-dryer 408 as well as its physical size, for example. Additionally, since the system for making sheets, films, and objects 400 controls the flow and pressure of the polymer melt from the reactor-dryer 408 to the dies, such as die forming units 140 and 152, the feed rate of the polymer slurry to the reactor-dryer 408 may partly provide the designed flow and pressure of the polymer melt at each of the die forming units 140 and 152.

In one embodiment, the slurry medium may be any inert liquid normally used in slurry polymerizations or the liquid monomer used in a bulk polymerization. The reactor-dryer 408 may have one or more sections, preferably two or more sections which are separated by baffles which can be of various types. Weirs, if used, can be attached to the drive shaft 412 with slip rings or fixed to the walls of the reactor-dryer 408 and are beneficially oriented so that the top of the weir is roughly aligned with the bed orientation during agitation. This provides for spill-over along the entire length of the weir top. However, the weirs can be oriented horizontally, if desired. Other types of barriers can be used in place of the weirs to minimize gross back-mixing between the two or more sections of the reactor-dryer 408. For example, thin wall barriers attached to the drive shaft 412 which fill the reactor cross-section and have one or more holes cut in them can be used as can be understood by one skilled in the art.

The polymer particulate passes through the solids take-off and falls into the take-off vessel. This polymer particulate can then be treated with additives and melt extruded in ways conventional to the art or it can be taken off the reactor-dryer without substantial pressure letdown and melted using the heat of further polymerization and thereafter melt finished.

The polymer solid in reactor-dryer 408 traverses the length of reactor essentially because of polymer build-up in the bed and not by the stirring agitation. This condition is insured by the paddle design used which provides for agitation but for no essentially backward or forward movement of the bed. The recycle rate is preferably adjusted so that the bed is not fluidized adding to the economy of the process. Polymer particulate in the bed adjacent to the take-off barrier is swept by the stirring through the take-off barrier opening, which opening may be made variable in size and position by a number of devices for maintaining different levels of polymer particulate in the reactor-dryer 408.

The interior of the reactor-dryer 408 may be equipped with a rotating drive shaft 412 extending longitudinally through the reactor-dryer 408 to which are attached paddles 416, 418, 420, 422, 424, and 426 extending transversely from the drive shaft 412 and beneficially making close clearance with the inside wall of reactor-dryer 408 to insure adequate bed mixing at the reactor wall. The paddles 416, 418, 420, 422, 424, and 426 are preferably flat to maximize bed agitation for a given rotational speed and preferably two paddles per impellor are used. Other shapes and numbers of paddles 416, 418, 420, 422, 424, and 426 per impellor can be used. The width of the paddles 416, 418, 420, 422, 424, and 426 is such that between about two and about twelve impellors (4 to 24 paddles) will be present in a reactor-dryer 408 section of about three feet in length, for example. However, this choice depends upon the size of the reactor-dryer 408. The paddles 416, 418, 420, 422, 424, and 426 are so constructed to minimize any forward or backward movement of the bed during stirring and are driven at such a speed as to give a slow and regular turnover of the entire polymer bed contained in the reactor-dryer 408. The speed at which the impellors turn should be fast enough to provide the desired heat and mass transfer between liquid, solid and gas but not so fast that the finer portions of the polymer bed are thrown up in large quantities into the space above the bed. That is, the speed preferably is about five to about forty revolutions per minute ("RPM") so that the integrity of the bed is maintained.

The space following the take-off barrier and above the take-off vessel can be likewise equipped with one or more similar impellors, the number of which depend upon the size of the take-off zone. Nevertheless, take-off assemblies such as end or side take-off apertures, which assemblies replace the take-off barrier, can be used as can be understood by one skilled in the art.

Temperature and pressure conditions in the reactor-dryer 408 generally depend upon those used in pre-mix vessel 404 and/or flash melter 454, for example. Nevertheless, the temperature and pressure conditions can be set independently of those used in the reactor-dryer 408 depending upon the type of polymerization used, monomer employed, etc. In general, the temperature range used in the reactor-dryer 408 varies between about 40° C. up to about the softening temperature of the bed of reactor-dryer 408, for example.

The total pressure of the reactor-dryer 408 is composed of the polymerizable monomer pressure, vaporized slurry medium pressure and hydrogen, if used, pressure and such total pressure typically may vary from above about atmospheric to about 600 pounds per square inch gauge ("psig"), for example. The individual partial pressures of the components making up the total pressure determine the rate at which polymerization occurs in the reactor-dryer 408 and in part the molecular weight and the molecular weight distribution of the final product.

Preferably, between about 5% and about 50% of the overall amount of polymerization is accomplished in the reactor-dryer 408 and, more preferably, it runs between about 10% and 30%, for example.

If desired, a second monomer or a mixture of monomers can be employed in the reactor-dryer 408 thereby producing copolymer product. Operation of the flash melter 454 and subsequent finishing operations if melt finishing is used rather than conventional finishing, e.g. extruders, are those taught in U.S. Pat. No. 3,970,611, the subject matter of which is by reference incorporated herein.

In another embodiment, system for making sheets, films, and objects 400 may also use one or more co-extruders 204, such as discussed relative to FIG. 2. In this embodiment, one of more co-extruders 204 are co-fed with a polymer, such as LLDPE contained in pipe 138 or 150. The co-extruded material is fed from co-extruder 204 to a feed or combination block 212 via pipe 202 along with the polymer, produced from the slurry or solution polymerization process, from the flow channels as described above. The combination block 212 then layers the materials properly into the flat die 208. This combination block 212 orientates the streams producing a multi-layer stream, which is fed to a flat die 208 via pipe 206 where it is extruded into the sheet forming section or polymer sheet 210. The co-extruder 204 can use polymer pellets from a polymer chip stream 124 or be a different material such as an adhesive tie layer or barrier resin, but not limited to these examples. This co-extrusion process may be added to any or all the die forming units 140 and 150. In one embodiment, the size of the co-extruder 204 is designed relative to the pounds throughput required. In using a co-extruder 204 in the present system for making sheets, films, and objects 400, preferably, the added pounds of material added into the system must be taken into account to provide the required cooling capacity of the leg of the present system for making system for making sheets, films, and objects 400, for example.

In one aspect, flat die 208 may be a coat hanger die. In another aspect, combination block 212 may be a combining block such as a Cloren Block or a surface mixed layer ("SML") block manufactured in Lentz, Austria. The combining block 212 may feed directly into a flat or annular die, such as flat die 208. Flat die 208 may be used to "cast" a product or an annular die when a blown film process is used. Preferably, the ratio of the extruder pumps to the main pump may set the thickness of the finished product. Additionally, the internal settings of the combining block 212 may set a particular polymer layer distribution of a particular sheet, film, or object product. For example, system for making sheets, films, and objects 400 may produce a layer configuration of from about two to about fourteen layers depending on the feed or combining block 212 and the number of co-extruders feeding the combination block 212.

Referring back to FIG. 5, system for making sheets, films, and objects 500 is shown without the control loop as shown in FIG. 4. Specifically, system for making sheets, films, and objects 500 may include a second devolatilizer or flash tank 506 which receives the polymer melt from flash melter 454. Volatile components may be removed from the molten polymer in flash tank 506 through line 504 either by vacuum or by employing a sweep of inert gas entering through another line (not shown), which may be suitably connected to flash tank 506. Polymer melt 510 collects at the bottom of flash tank 506 and is pumped through line 512 by polymer gear pump 508. System for making sheets, films, and objects 500 includes several polymer gear pumps 518 and 520 that are located downstream of flash tank 474. Additionally, system for making sheets, films, and objects 500 includes several polymer gear pumps 514 and 516 that are located downstream of flash tank 506. The polymer gear pumps 514, 516, 518, and 520 are required to maintain a fixed pressure with minimal variation by balancing the pressure disturbances in the entire system for making sheets, films, and objects 500. In one embodiment, the polymer gear pumps 514, 516, 518, and 520 are gear pumps that pass a known volume of polymer melt through with each revolution. The speed of the polymer gear pumps 514, 516, 518, and 520 may be controlled by a pressure sensor on the outlet side of the polymer gear pumps 514, 516, 518, and 520. In one aspect, as the pressure is reduced, polymer gear pumps 514, 516, 518, and 520 may increase in speed to increase the flow and pressure through the lines 512 and 480 or may decrease in speed to decrease the flow and pressure through lines 512 and 480.

In one embodiment, the present system for making sheets, films, and objects 500 is a continuous process which is not shut down once it is started. One way to control the mass flow of the polymer melt through the system for making sheets, films, and objects 500 is by adjusting the mass flow of the feedstocks through line 402 into the reactor-dryer 408. Additionally, a pressure feed back loop can be used to control the polymer gear pumps 514, 516, 518, and 520. The polymer gear pumps 514, 516, 518, and 520 are used to control the final pressure into a die 522. Die 522 may be any die commonly known, such as those described herein, for example die forming units 140 and 152. Nevertheless, due to the critical nature of the pressure entering die 522, it may be necessary or preferably to add more than one polymer gear pumps at this point. The additional pumps (not shown) may be used in tandem and are controlled by a pressure feed back loop to change the mass flow of polymer melt into die 522 as the forming line changes speed or are shut down. Although a single polymer gear pump may be used, the variation in pressure do to the influence of pressure changes from any other section in the entire distribution system may not be sufficient to maintain part dimensional uniformity. As an example, it is preferable to maintain +/−1 bar in pressure into a flat die to maintain proper control of the finished sheet.

In one embodiment, there are multiple polymer gear pumps 514, 516, 518, and 520 feeding the die 522. Preferably, polymer gear pumps 514 and 516 maintains the pressure in the line 512 and polymer gear pumps 518 and 520 maintains the pressure in the line 480, both of which feed die 522. If the pressure drops in the lines 480 and 512, the polymer gear pumps 514, 516, 518, and 520 will increase pressure, thus providing a continuous designed pressure and volume of polymer melt to the die 522. If the pressure increases significantly, such as outside designed parameters, then any or all polymer gear pumps 514, 516, 518, and 520 may slow down or the polymer melt material may be switched into bypass chip stream (not shown) bypassing the manifolds die 522. Where polymer gear pumps 514, 516, 518, and 520 include two or more polymer gear pumps in series, the first polymer gear pump of the multiple polymer gear pump arrays may be used to modulate the pressure in the die 522, for example. In this arrangement, the first polymer gear pump in the series of pumps comprising polymer gear pumps 514, 516, 518, and 520 maintains a constant pressure head into the second polymer gear pump in the series of polymer gear pumps 514, 516, 518, and 520. Preferably, the multiple polymer gear pumps provide highly dependent thickness control with a constant pressure into die 522. The first polymer gear pump may modulate any large swings in pressure, in one aspect. The second polymer gear pump and each proceeding polymer gear pump may further reduce any modulation down to less then +/−1 bar after the final polymer gear pump. This provides for the forming lines (outputs) to remain independent so they can slow down, start stop or increase speed independently of the other line, either line 480 or line 512. The pressure control loops with the bypass chip stream will provide this function. In one embodiment, the pumps are volumetric pumps as described herein.

In one embodiment, this is accomplished while having each line 480 or 512 independent of the other line 480 or 512.

In one embodiment, the control loop provides for sudden process upsets, such as starting or stopping of one of the lines 480 and 512. In this embodiment, a bypass chip stream allows for the chip production to increase or decrease based on any process upset. The upset can be a planned upset, such as stopping a line for maintenance, etc., or unplanned upset, such as an equipment malfunction.

In addition to the above, the control loop preferably compensates for one line increasing or decreasing speed while continuing the overall system for making sheets, films, and objects 500 in a steady state. Any upstream sources of pressure and associated valves (not shown) may react by diverting to or from the bypass chip stream. This may cause a brief spike or change in pressure that will be reacted to by polymer gear pumps 514, 516, 518, and 520 operating on the lines 512 and 480 that will then react to the pressure spike and modulate it in a controllable and desirable fashion. In this embodiment, the individual pumps that comprise polymer gear pumps 514, 516, 518, and 520 may experience the pressure spike and react to it while the second polymer gear pump in the series will experience the modulation of the upset magnitude that will be sufficiently low as to be modulated out in the order of magnitude of less than a second. In another embodiment, each line configuration is going to be different so individual schemes will apply to that system. Preferably, a combination of the flash melter 454, polymer gear pumps 514, 516, 518, and 520, and control loop provide an optimized polymer melt pressure and flow through the lines 512 and 480 to the forming portions or die 522.

In another embodiment, lines 480 and 512 may contain different type polymer melt for making a multi-layer object or sheet. As described above, polymer melt is fed through lines 480 and 512 to die 522 and may be oriented such as to provide spatially oriented individual sheets or feeds to die 522. These polymer melt feeds in lines 480 and 512 orientate their respective polymer melt streams to produce a multi-layer stream, which is fed to die 522 where it is extruded into a multi-layer sheet 524. Additionally, subsystem 300 may be used to further make a multi-layer object or sheet, for example. For example, the system for making sheets, films, and objects 400 and 500 may make interpolymer compositions that are useful in cast stretch film manufacture that have excellent balance and strength and processability. The system for making sheets, films, and objects 400 and 500 may be applicable to the stretch film process described in U.S. Pat. No. 6,812,289 issued Nov. 2, 2004 to Van Dun et al., which is hereby incorporated by reference. The stretch film manufacture of the system for making sheets, films, and objects 400 and 500 may be those described in U.S. Pat. No. 6,812,289 and the reaction conditions may be the same as those described in U.S. Pat. No. 6,812,289.

Additionally, the die 522 of system for making sheets, films, and objects 400 and 500 may be an annular die for use in a bubble process for making single layer or multi-layer objects or sheets as is commonly known in the arts. Further, the die 522 of system for making sheets, films, and objects 400 and 500 may be a flat die, as described herein, for use in making single layer or multi-layer films or sheets, for example.

The present system for making sheets, films, and objects 400 and 500 may be used to make any type of objects and/or sheets from most types of polymer melts. The system for making sheets, films, and objects 400 and 500 includes any type of slurry or solution polymerization processes. Some exemplary polymers include linear low density polyethylene ("LLDPE"), low density polyethylene ("LDPE"), polypropylene, polystyrene, poly-methyl-methacrylate ("PMMA"), vinyl acetates, acrylonitrile, and esters of acrylic acid.

In one embodiment, reactor-dryer 408 is applicable to a large number of continuous polymerization processes in which it is desired to contact monomer and initiator to form a desired polymer. The reactor is particularly applicable to the production of homopolymers or conjugated dienes or random copolymers of conjugated dienes and vinyl aromatic compounds in solution polymerization processes. Any suitable olefinic monomer may be contacted with any suitable initiator in reactor-dryer 408 under any suitable conditions to produce a desired polymer. Specific olefinic monomers, initiator systems and reaction conditions are well known. As an example, U.S. Pat. No. 3,219,647, which is hereby incorporated by reference, discloses suitable olefinic monomers which may be used in continuous polymerization systems which employ the transition metal/organometal catalyst systems which are generally referred to as the Zeigler-type initiators. The reaction conditions may be the same as those described in U.S. Pat. No. 3,219,647. It is noted that if the initiator system comprises two or more components, the most convenient way for such initiator systems to be utilized with reactor-dryer 408 is for the initiator components to be pre-mixed prior to charging to reactor-dryer 408 through line 410. In this manner, if more than one monomer is utilized or if a solvent, gel suppressant, or other reactant is desired, it may be preferred to mix the two or more monomers and the additional reactants prior to introducing such mixture into reactor-dryer 408.

U.S. Pat. No. 4,091,198 discloses continuous polymerization of a conjugated diene with a monovinyl aromatic compound in the production of random copolymers by organo-lithium initiation. The reactor-dryer 408 may be applicable to the continuous polymerization process described in U.S. Pat. No. 4,091,198 which is hereby incorporated by reference. The monomer and initiator introduced into the reactor-dryer 408 may be those described in U.S. Pat. No. 4,091,198 and the reaction conditions may be the same as those described in U.S. Pat. No. 4,091,198.

In one embodiment, the processes described herein can be applied to the drying and finishing of polymerizable monomers which are polymerizable below the softening point of their polymeric forms including ethylene, propylene, 4-methyl-pentene-1, butene-1, vinyl chloride, butadienes, styrene and mixtures of such monomers, for example. Particularly suitable are ethylene, propylene, their mixtures and mixtures of ethylene or propylene with at least one of the other monomers set forth above.

In one aspect, the catalysts which are most useful to the processes described herein are those which are very active and give a high yield on catalyst. Included in this group are co-catalysts composed of organo-metallic compounds of Periodic Groups IA, IIA, and IIIA and catalysts which are based on transition metal compounds. Aluminum alkyl compound co-catalysts are especially preferred and may be tri-alkylaluminum or an alkyl aluminum halide such as a dialkylaluminum chloride. The transition metal catalyst can be a metal compound of Group IV or Group V such as a titanium or vanadium compound, a compound of Group VI such as chromium or molybdenum oxide or may be one of the above catalysts supported on a magnesium-based support or a support such as alumina, silica, or silica-alumina.

The preferred catalysts and co-catalysts are as aforesaid high yield catalysts. By high yield is meant catalysts and co-catalysts the residues of which do not have to be removed from the products of the process.

In another embodiment, the present system for making sheets, films, and objects 400 and 500 may include making ethylene polymer objects and sheets. The reactor-dryer 408 may be applicable to the continuous polymerization process described in U.S. Pat. No. 5,442,018 issued Aug. 15, 1995 to Cann et al., which is hereby incorporated by reference. The monomer and initiator introduced into reactor-dryer 408 may be those described in U.S. Pat. No. 5,442,018 and the reaction conditions may be the same as those described in U.S. Pat. No. 5,442,018.

In yet another embodiment, present system for making sheets, films, and objects 400 and 500 may include making ethylene objects and sheets. The reactor-dryer 408 may be applicable to the continuous polymerization process described in U.S. Pat. No. 5,442,018 issued Aug. 15, 1995 to Cann et al. and U.S. Pat. No. 5,589,555 issued Dec. 31, 1996 to Zboril et al., which are hereby incorporated by reference. The monomer and initiator introduced into reactor-dryer 408 may be those described in U.S. Pat. No. 5,442,018 and U.S. Pat. No. 5,589,555 and the reaction conditions may be the same as those described in U.S. Pat. No. 5,442,018 and U.S. Pat. No. 5,589,555.

In another embodiment, the present system for making sheets, films, and objects 400 and 500 may include making LLDPE polymer objects and sheets. The reactor-dryer 408 may be applicable to the continuous polymerization process described in U.S. Pat. No. 5,986,021 issued Nov. 16, 1999 to Hokkanen et al., which is hereby incorporated by reference. The monomers and initiators introduced into reactor-dryer 408 may be those described in U.S. Pat. No. 5,986,021 and the reaction conditions may be the same as those described in U.S. Pat. No. 5,986,021.

In another embodiment, the present system for making sheets, films, and objects 400 and 500 may include making objects and sheets from solution polymerization processes. The reactor-dryer 408 may be applicable to the solution polymerization process described in U.S. Pat. No. 6,777,509 issued Aug. 17, 2004 to Brown et al., which is hereby incorporated by reference. The monomers and initiators introduced into reactor-dryer 408 may be those described in U.S. Pat. No. 6,777,509 and the reaction conditions may be the same as those described in U.S. Pat. No. 6,777,509.

The preferred catalysts and co-catalysts for ethylene polymerization are a tri-alkylaluminum co-catalyst with a catalyst which is a titanium compound supported on magnesium-based support or chromium oxide supported on alumina, silica or combinations thereof. For propylene polymerization it is preferable to use a dialkylaluminum chloride co-catalyst and a catalyst which is a titanium trichloride. Nevertheless, the process and apparatus described herein are not meant to be limited to the catalyst and co-catalyst used except in that the processes operate best using high yield catalyst systems which retain substantially their activity until deliberately killed.

In one embodiment, the feedstocks that may be fed into pre-mix vessel 404 via line 402 for making LLDPE may include ethylene and higher alpha olefins, such as butane, hexane, or octane, for example. In one aspect, the catalyst that may be fed into pre-mix vessel 404 via line 403 may include Ziegler or Philips types of catalysts. The reactor-dryer 408 may include either solution phase or gas phase reactors, for example. In one aspect, octane may be a copolymer in solution phase while butane and hexane may be copolymerized with ethylene in a gas phase reactor-dryer 408.

In another embodiment, the feedstock that may be fed into pre-mix vessel 404 via line 402 for making LDPE may include the monomer ethylene and may be made by free-radical initiated polymerization in reactor-dryer 408, for example.

In another embodiment, the feedstock that may be fed into pre-mix vessel 404 via line 402 for making polypropylene may include the monomer propylene and a Ziegler-Natta catalyst, for example. Another known catalyst that may be used for making polypropylene is a metallocene catalyst, such as a Kaminsky catalyst, for example. Additionally, the system for making sheets, films, and objects 400 and 500 may use a co-catalyst for activation when making polypropylene, such as methylamuinoxane ("MAO"), $Al(C_2H_5)_3$ These catalysts may be introduced into pre-mix vessel 404 via line 403.

In one embodiment, the feedstock that may be fed into pre-mix vessel 404 via line 402 for making polystyrene may include styrene $(C_8H_9)_n$, and may further include a metallocene catalyst, for example. In another embodiment, the feedstocks of the system for making sheets, films, and objects 400 and 500 may further include vinyl polymers including polymerized simple alkenes: polyethylene from ethane, polypropylene from propene, and polybutadiene from butadiene. Some other exemplary feedstocks for making vinyl polymers include polyvinyl chloride that is made by polymerization of the monomer vinyl chloride (chloroethene); polyvinyl acetate that is made by polymerization of vinyl acetate; polyvinyl alcohol that is made by the hydrolysis of polyvinyl acetate; and polyacrylonitrile, which is prepared from acrylonitrile.

Preferably, systems for making sheets, films, and objects 400 and 500 are capable of controlling or maintaining the pressure within their systems +/−1 bar into the flat die to maintain proper control of the thickness of the finished sheet, film, or object. The plurality and location of pumps in systems for making sheets, films, and objects 400 and 500 provides individual improved control of each leg of these systems to maintain such pressure tolerances.

Further, as discussed above, bypass chip stream 124 may have an adjustable throughput such that it may process from 0% to 100% of the polymer from reactor-dryer 408 and flash tank 474. For example, 100% of the throughput in pelletizing of polymer produced by systems for making sheets, films, and objects 400 and 500 may be processed through bypass chip stream 124. In another example, any other percent of the throughput in pelletizing of polymer produced by systems for making sheets, films, and objects 400 and 500 may be processed through bypass chip stream 124. In one aspect, a percentage of the polymer may be processed through bypass chip stream 124 and a percentage of the polymer may be processed through distribution manifolds 126 and 128.

Figure 6:
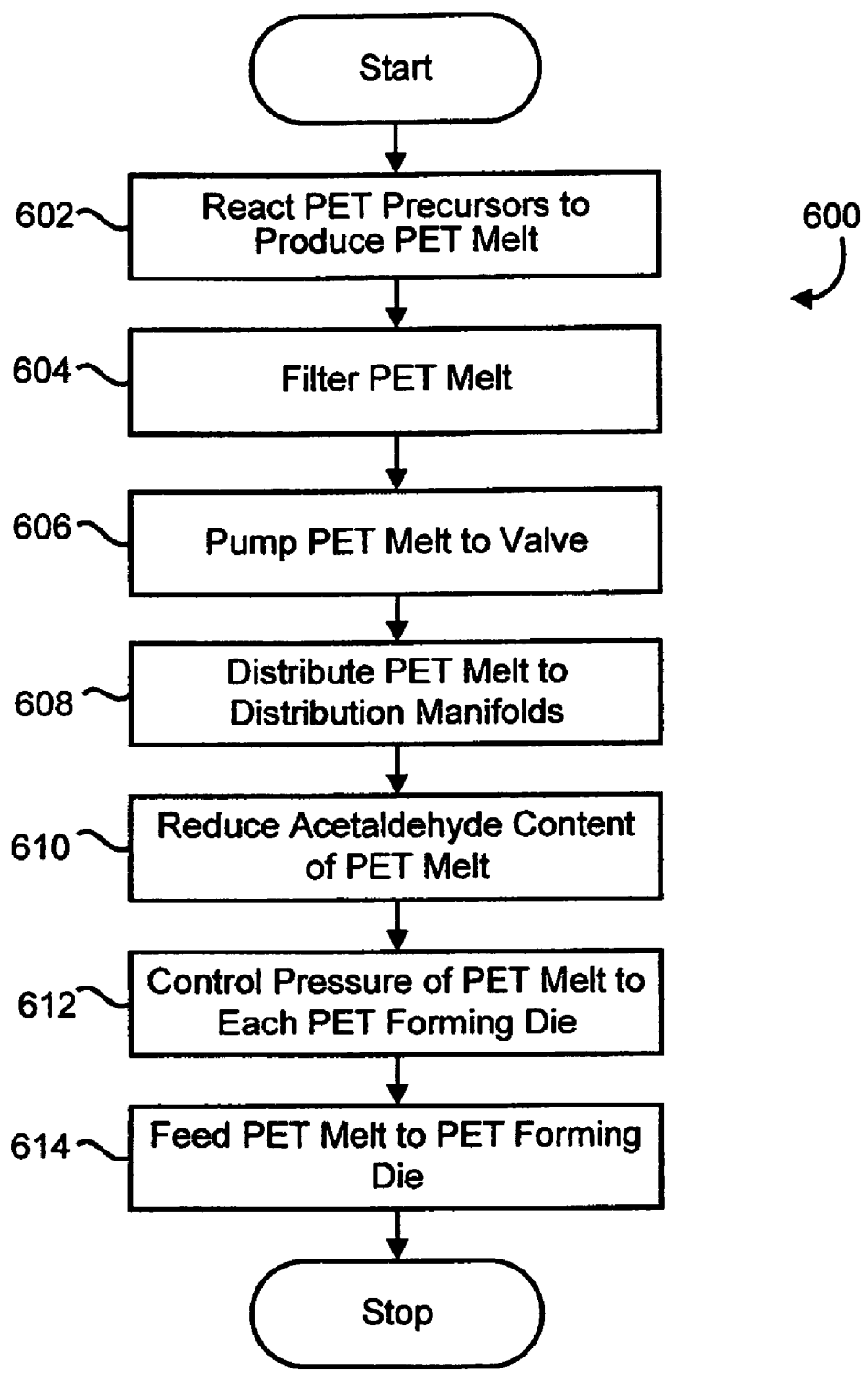
FIG. 6 illustrates a flow diagram of a process for making PET sheets, films, and objects according to an embodiment of the present invention.

In addition to the aforementioned aspects and embodiments of the present system for making PET sheets system for making PET sheets 100, the present invention further includes methods for manufacturing these PET sheets. FIG. 6 illustrates a flow diagram of an embodiment 600 of one such process. In step 602, a first PET precursor and a second PET precursor as described above are reacted in a reactor to produce a PET melt. Preferably, in this step, the known reactor capacity and a given product mix of sheet thicknesses and widths are determined. From this information the number of manifold legs is determined by considering the cooling capacity of each of the die forming units. The cooling capacity preferably determines the maximum throughput of each downstream leg. In one aspect, a bypass chip stream 124 can be introduced into the reactor 106 at this step. In another aspect, a side stream of scraps from the previous operation may be introduced into the reactor 106 at this step.

In step 604, the PET melt is filtered to remove impurities from the PET melt. In step 606, the PET melt is flowed via a positive or negative displacement apparatus, such as a pump, to a valve having preferably multiple outlets. In step 608, the PET melt is flowed from the valve outlets to individual distribution manifolds connected to each individual valve outlet. In one embodiment, each of two outlets is connected to a separate distribution manifold. Connected to each distribution manifold are at least one distribution lines that preferably terminate at a PET object die forming apparatus. In addition, one of the outlets of the valve feeds a side chip stream for forming PET pellets.

In step 610, the acetaldehyde content of the PET melt is reduced if necessary as described above. This may include using a vacuum section with a driven screw section in the line to reduce the acetaldehyde content in the PET melt. In another embodiment, a thin film degassing technique may be used to reduce the acetaldehyde content in the PET melt.

In step 612, the pressure or mass flow of the PET melt is individually controlled in each of the distribution lines by a pump or other apparatus that controls the mass flow or pressure of the PET melt within each distribution line separate from the other distribution lines. In step 614, the PET melt in each distribution line is fed to a PET object forming die or sheet forming subsystem.

Figure 7:
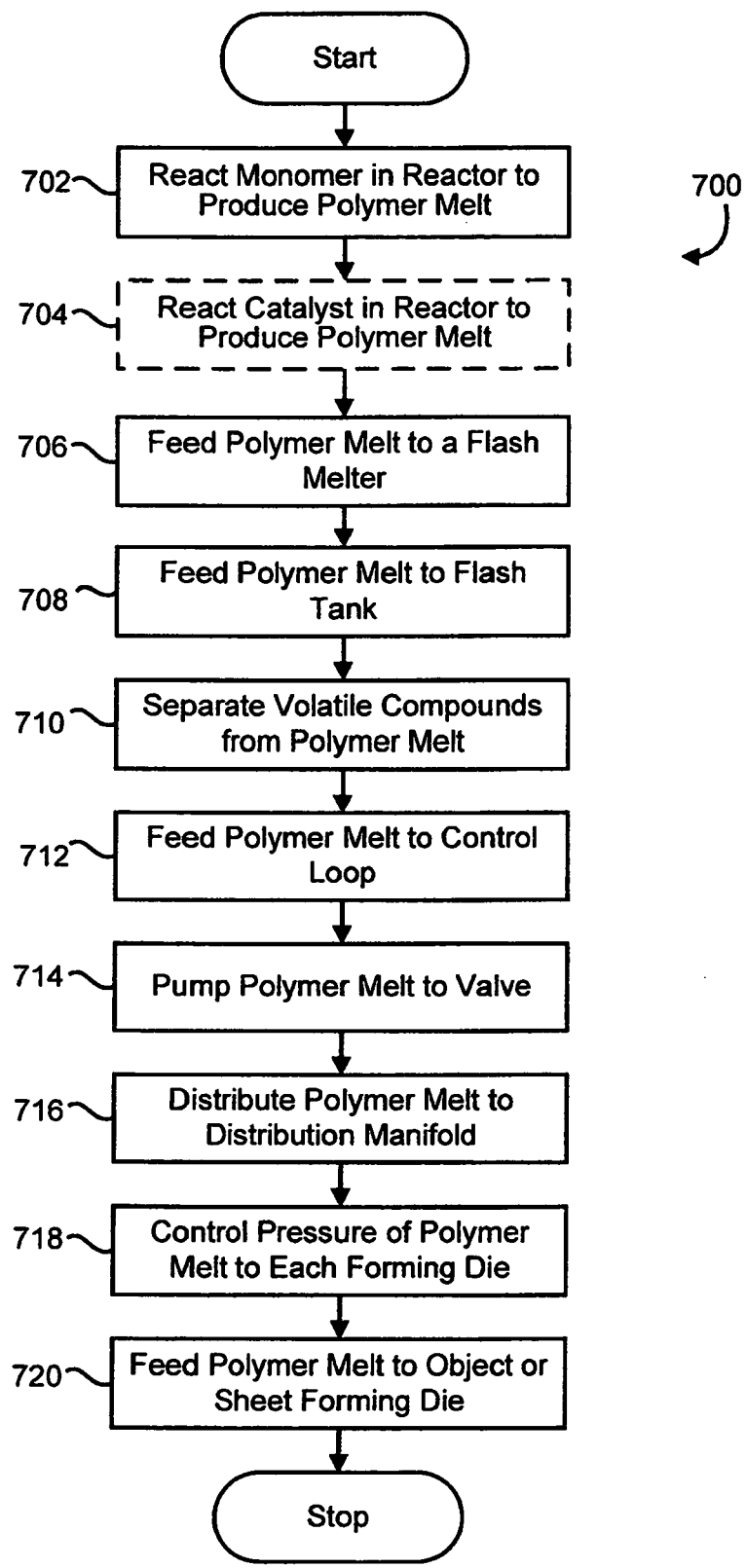
FIG. 7 illustrates a flow diagram of a process for making polymer sheets, films, and objects according to an embodiment of the present invention.

In another embodiment, the present system for making sheets, films, and objects includes a method for making objects and sheets from polymer materials. FIG. 7 illustrates a flow diagram of an embodiment 700 of one such process. In steps 702 and 704, feedstocks, such as a monomer and optionally a catalyst as described above are reacted in a reactor to produce a polymer melt. Preferably, in this step, the known reactor capacity and a given product mix of sheet thicknesses and widths are determined. From this information the number of manifold legs is determined by considering the cooling capacity of each of the die forming units, for example. The cooling capacity preferably determines the maximum throughput of each downstream leg. In one aspect, a bypass chip stream 124 can be introduced downstream of the reactor-dryer 408 at this step. In another aspect, a side stream of scraps from the previous operation may be introduced into the reactor-dryer 408 at this step.

In step 706, the polymer melt is fed to a flash melter, such as flash melter 454, where a supply of heat may be supplied to further the polymerization step. In step 708, the polymer melt is fed into a flash tank, such as flash tank 474. This step may include using polymer gear pumps to feed the polymer melt from the flash melter 454 to flash tank 474, for example. This step may further include heating the flash tank to a temperature that is sufficient to vaporize a desired hydrocarbon component of the polymer melt. Once vaporized, the hydrocarbon may be removed from the flash tank and recycled back to the pre-mix vessel, such as pre-mix vessel 404, for example. In step 712, the polymer melt may be fed to a control loop, such as that described relative to FIG. 1. The feeding process may also be under the control of one or more polymer gear pumps. Additionally, the polymer melt may be fed to a master pump, such as master pump 110, prior to entering the control loop. In one aspect, the master pump is a component of the control loop.

In step 714, the polymer melt is flowed via a positive or negative displacement apparatus, such as a master pump, to a valve having preferably multiple outlets. In step 716, the polymer melt is flowed from the valve outlets to individual distribution manifolds connected to each individual valve outlet. In one embodiment, each of two outlets is connected to a separate distribution manifold. Connected to each distribution manifold are at least one distribution lines that preferably terminate at an object or sheet die forming apparatus. In addition, one of the outlets of the valve feeds a side chip stream for forming polymer pellets.

In step 718, the pressure or mass flow of the polymer melt is individually controlled in each of the distribution lines by a pump or other apparatus that controls the mass flow or pressure of the polymer melt within each distribution line separate from the other distribution lines. In step 720, the PET melt in each distribution line is fed to a PET object forming die or sheet forming subsystem.

Although there has been described what is at present considered to be the preferred embodiments of the system for making sheets, films, and objects, it will be understood that the present system for making sheets, films, and objects can be embodied in other specific forms without departing from the spirit or essential characteristics thereof. For example, additional pumps or different combinations of pumps, other than those described herein could be used without departing from the spirit or essential characteristics of the present system for making sheets, films, and objects. The present embodiments are, therefore, to be considered in all aspects as illustrative and not restrictive. The scope of the present system for making sheets, films, and objects is indicated by the appended claims rather than the foregoing description.

What is claimed:

1. A system for making sheets, films, and objects comprising:
    a reactor-dryer for reacting at least one monomer to produce a polymer melt;
    a flash melter in communication with the reactor-dryer for heating the polymer melt received from the reactor-dryer;
    a flash tank in communication with the flash melter for removing volatile compounds from the polymer melt; and
    a control loop in communication with the flash tank for controlling the pressure of the polymer melt from the flash tank to a die forming unit, wherein the control loop includes a first, second, and third pump and a distribution manifold, the die forming unit includes a first and second die, the first pump located after the flash tank but before a distribution manifold, the second pump located between the distribution manifold and the first die, the third pump located between the distribution manifold and the second die, and the first die and second pump and the second die and third pump are separate legs of the system interconnected with the manifold, wherein the first, second, and third pump function in unison to control the pressure in the control loop, the first pump maintains the pressure into the manifold, and the first pump is responsive to the pressure at the second and third pumps and increases the pressure if the pressure drops in the second pump.

2. The system for making sheets, films, and objects of claim 1, further comprising;
    a pre-mix vessel in communication with the reactor-dryer for receiving at least one of the group consisting of monomers, co-monomers, catalysts, and solvents and delivering them to the reactor-dryer.

3. The system for making sheets, films, and objects of claim 1, further comprising:
    at least one polymer gear pump located between the flash melter and the flash tank for controlling the mass flow of the polymer melt to the flash tank.

4. The system for making sheets, films, and objects of claim 1, further comprising:
    at least one polymer gear pump located between the flash tank and the control loop for controlling the mass flow of the polymer melt to the control loop.

5. The system for making sheets, films, and objects of claim 1, further comprising:
    at least one additive unit located between the flash melter and the flash tank for adding an additive to the polymer melt prior to polymer melt entering the flash tank.

6. The system for making sheets, films, and objects of claim 1, further comprising:
    at least one source of a co-extruded polymer located prior to the die forming unit.

7. The system of claim 2 wherein the control loop is configured to control the pressure to within +/−1 bar.

8. The system of claim 2 wherein the control loop is configured to maintain the pressure entering the die at a uniform set pressure.

9. The system of claim 2 wherein the control loop is configured to reduce a pressure spike.

10. The system of claim 1, wherein the second pump independently controls the pressure and flow to the first die and the third pump independently controls the pressure and flow to the second die.

* * * * *